United States Patent
Kitchin et al.

(10) Patent No.: US 10,372,452 B2
(45) Date of Patent: Aug. 6, 2019

(54) MEMORY LOAD TO LOAD FUSING

(71) Applicant: Samsung Electronics Co., Ltd., Suwon-si, Gyeonggi-do (KR)

(72) Inventors: Paul E. Kitchin, Austin, TX (US); Rama S. Gopal, Austin, TX (US); Karthik Sundaram, Austin, TX (US)

(73) Assignee: SAMSUNG ELECTRONICS CO., LTD. (KR)

( * ) Notice: Subject to any disclaimer, the term of this patent is extended or adjusted under 35 U.S.C. 154(b) by 128 days.

(21) Appl. No.: 15/615,811

(22) Filed: Jun. 6, 2017

(65) Prior Publication Data

US 2018/0267800 A1 Sep. 20, 2018

Related U.S. Application Data

(60) Provisional application No. 62/471,354, filed on Mar. 14, 2017.

(51) Int. Cl.
*G06F 9/30* (2018.01)
*G06F 9/35* (2018.01)
*G06F 12/0875* (2016.01)
*G06F 9/38* (2018.01)

(52) U.S. Cl.
CPC ............ *G06F 9/30043* (2013.01); *G06F 9/35* (2013.01); *G06F 9/3826* (2013.01); *G06F 9/3838* (2013.01); *G06F 12/0875* (2013.01); *G06F 2212/452* (2013.01)

(58) Field of Classification Search
None
See application file for complete search history.

(56) References Cited

U.S. PATENT DOCUMENTS

| | | | |
|---|---|---|---|
| 6,449,193 B1 | 9/2002 | Love et al. | |
| 7,047,444 B2 | 5/2006 | Hatakeyama | |
| 8,108,651 B2 | 1/2012 | Gruijters et al. | |
| 9,436,615 B2 | 9/2016 | Gorobets | |
| 2008/0195805 A1 | 8/2008 | Kwon | |
| 2015/0309792 A1* | 10/2015 | Meier | G06F 9/30043 712/225 |

FOREIGN PATENT DOCUMENTS

JP   2007280373 A   10/2007

* cited by examiner

*Primary Examiner* — Corey S Faherty
(74) *Attorney, Agent, or Firm* — Renaissance IP Law Group LLP

(57) ABSTRACT

A system and a method to cascade execution of instructions in a load-store unit (LSU) of a central processing unit (CPU) to reduce latency associated with the instructions. First data stored in a cache is read by the LSU in response a first memory load instruction of two immediately consecutive memory load instructions. Alignment, sign extension and/or endian operations are performed on the first data read from the cache in response to the first memory load instruction, and, in parallel, a memory-load address-forwarded result is selected based on a corrected alignment of the first data read in response to the first memory load instruction to provide a next address for a second of the two immediately consecutive memory load instructions. Second data stored in the cache is read by the LSU in response to the second memory load instruction based on the selected memory-load address-forwarded result.

20 Claims, 7 Drawing Sheets

MEMORY LOAD TO LOAD FUSING

CROSS-REFERENCE TO RELATED APPLICATION

This patent application claims the priority benefit under 35 U.S.C. § 119(e) of U.S. Provisional Patent Application No. 62/471,354, filed on Mar. 14, 2017, the disclosure of which is incorporated herein by reference in its entirety.

TECHNICAL FIELD

The subject matter disclosed herein generally relates to computing systems, and more particularly, to a system and a method to cascade execution of instructions in a load-store unit (LSU) of a central processing unit (CPU) to reduce latency associated with the instructions.

BACKGROUND

A CPU executes various kinds of instructions. One of the most common instructions executed by a CPU is a memory load (LD) instruction. The operations that may be associated with an LD instruction are executed in an LSU of a CPU that interfaces directly with a level 1 data (L1D) cache. Reducing the latency of LD instructions is critical for achieving high-performance CPU execution. The latency of an LD instruction in most CPUs varies between 3 to 5 cycles. Typically, such multi-cycle latency involves various complex operations that include an address lookup in a translation lookaside buffer (TLB), a tag index lookup in an L1D cache, a compare of a tag physical address, a data read of the L1D cache, and an alignment update of the data value that has been read from the L1D cache.

A CPU may execute an LD instruction that may drive, or cause, an address generation unit (AGU) to generate an address for an LD instruction that is immediately subsequent. That is, the address of the subsequent LD instruction (referred to herein as a consumer LD instruction) is dependent on the previous memory load operation (referred to herein as a producer LD instruction). For example, consider the following two LD instructions: LDR r0, [r1] and LDR r2, [r0]. In this example, the second LD instruction is immediately subsequent to the first LD instructions. Although the two instructions appear as two separate operations; in this case the first (producer) LD instruction performs a first LD operation and generates (produces) the memory address for the second (consumer) LD operation.

If an LD instruction drives the address generation for an immediately subsequent dependent LD instruction, the latency of each LD instruction sequentially combines to be the entire latency for both LD instructions. Thus, the latency of dependent memory load operations is critical to the performance of a CPU.

SUMMARY

One example embodiment provides a method to cascade execution of instructions of a CPU that may include reading one of a first data and first instruction stored in a first cache in response to a first memory load instruction of two consecutive memory load instructions; and performing in parallel, one or more of alignment, sign extension, and endian operations on the first data read from the first cache in response to the first memory load instruction, and selecting a memory-load address-forwarded result based on a corrected alignment of the one of the first data and the first instruction read in response to the first memory load instruction to provide a next address for a second memory load instruction of the two consecutive memory load instructions; and reading the corresponding one of a second data and a second instruction in response to the second memory load instruction based on the selected memory-load address-forwarded result. In one embodiment, the first memory load instruction may include a byte-aligned memory address, and wherein the first memory load instruction may include no sign extension.

One example embodiment provides a CPU that may include a load data alignment logic circuit to perform one or more of alignment sign extension and endian operations on one of a first data and a first instruction received from a cache in response to a first memory load instruction of two consecutive memory load instructions; and a selector logic circuit in parallel to the load data alignment logic circuit in which the selector logic circuit may perform in parallel with the load data alignment logic circuit a selection of a memory-load address-forwarded result based on a corrected alignment of the first data read in response to the first memory load instruction to provide a next address for a second memory load instruction of the two consecutive memory load instructions in which the selected memory-load address-forwarded result may be used to read second data from the cache in response to the second memory load instruction. In one embodiment, the first memory load instruction may include a byte-aligned memory address, and the first memory load instruction may include no sign extension.

BRIEF DESCRIPTION OF THE DRAWINGS

In the following section, the aspects of the subject matter disclosed herein will be described with reference to exemplary embodiments illustrated in the figures, in which.

DETAILED DESCRIPTION

Figure 1:
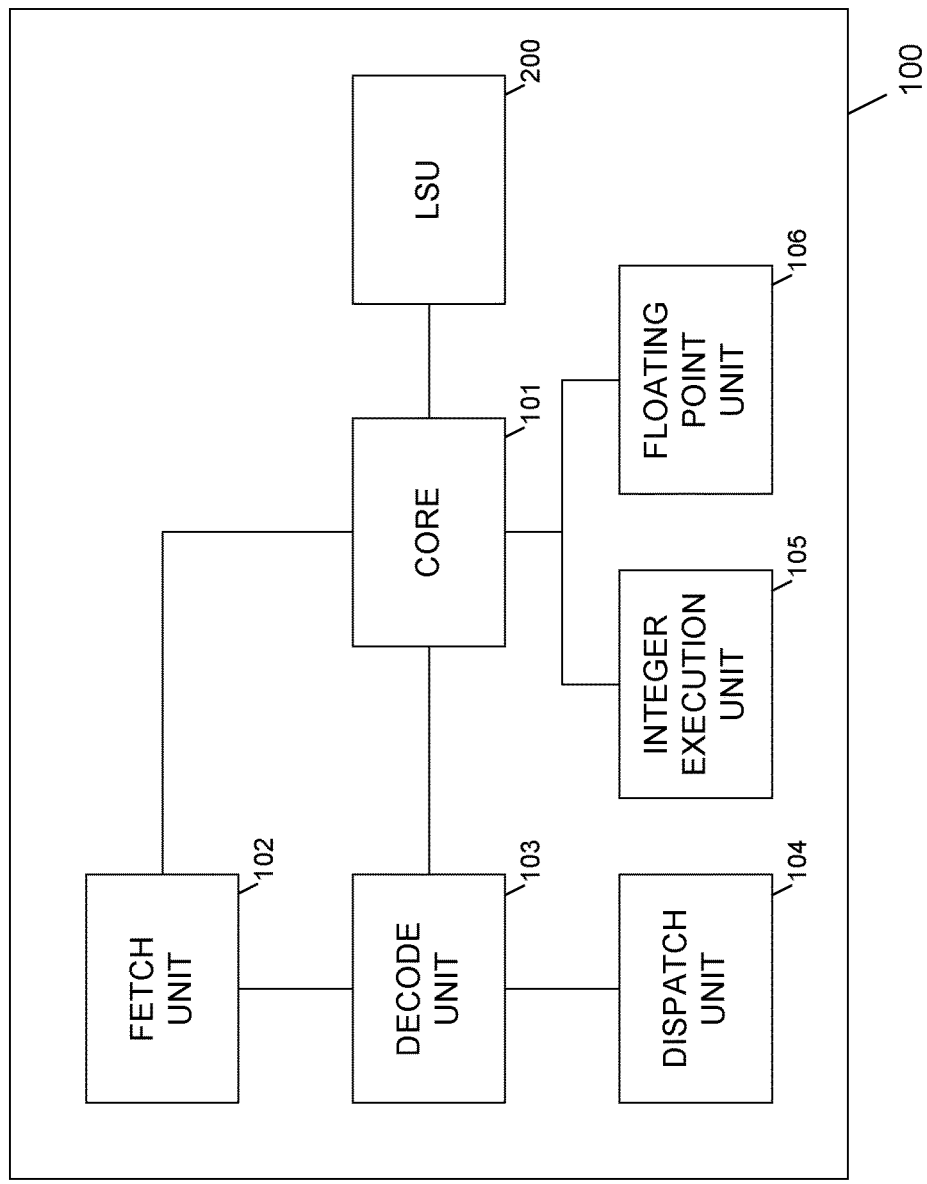
FIG. 1 depicts a functional block diagram of an example embodiment of a CPU that includes an LSU according to the subject matter disclosed herein that reduces latency associated with instructions executed by the CPU.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing particular exemplary embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement the teachings of particular embodiments disclosed herein.

Unless otherwise defined, all terms (including technical and scientific terms) used herein have the same meaning as commonly understood by one of ordinary skill in the art to which this subject matter belongs. For example, the term "mod" as used herein means "modulo." It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. The term "software," as applied to any implementation described herein, may be embodied as a software package, code and/or instruction set or instructions. The term "hardware," as applied to any implementation described herein, may include, for example, singly or in any combination, hardwired circuitry, programmable circuitry, state-machine circuitry, and/or firmware that stores instructions executed by programmable circuitry. The modules may, collectively or individually, be embodied as software, firmware and/or hardware that forms part of a larger system, such as, but not limited to, an integrated circuit (IC), system on-chip (SoC) and so forth.

The subject matter disclosed herein provides a system and a method that cascades, or fuses, an LD instruction and an immediately subsequent address-dependent LD instruction to reduce the overall latency of the two LD instructions. As used herein, the terms "instruction" and "operation" may be used interchangeably. Additionally, it should be understood that repeated cascading, or fusing, of instructions may be performed consecutively without limit. In one example embodiment, a LSU executes a first LD operation to output data from an L1D cache. The data that is read out of the L1D cache is input to two parallel logic paths within the LSU. The first logic path includes alignment logic that performs, for example, data alignment, sign extension and endian operations. The second logic path includes a first multiplexer that is used to select the correct byte alignment of the data output for the first LD instruction. The selected correct byte alignment result for the first LD instruction is provided to a second multiplexer that is used to select either a LD-to-LD address-forwarded result or a normal LD address path. The selected result from the second multiplexer becomes the address for the second LD instruction. The memory address for the second LD instruction output from the second logic path is generated in parallel with the alignment phase of the execution of the first LD instruction in the first logic path. Consequently, execution of the second LD instruction begins sooner. That is, execution of the first cycle of the second LD operation coincides with the last cycle of execution of the first LD operation. As a result, the LD-to-LD latency associated with the two LD instructions is reduced by at least one cycle in comparison to the LD-to-LD latency associated with a conventional load-store unit.

Considering again the two following LD instructions, LD r0, [r1] and LD r2, [r0], the subject matter disclosed herein cascades, or fuses, together the execution of the first LD instruction and the address-generation of an immediately subsequent address-dependent LD instruction as a single operation that is input to an LSU. As the LSU schedules the execution of the first LD instruction, the LSU detects that the two LD instructions for a cascaded LD/LD operation. The LSU begins the process of scheduling the second, dependent LD operation so that the first execution cycle of the second LD operation coincides with the final execution cycle of the first LD operation.

The data that is output from the L1D cache in response to the first LD instruction is input to two parallel logical circuits. The first logic circuit includes alignment logic that may perform all alignment, sign/zero extension and endian-manipulation that may be needed to satisfy the LD result. The alignment logic outputs the result of the LD instruction (LD r0, [r1]) to a register r0. The second logic circuit includes a first multiplexer that is used to select the correct byte alignment for the first LD operation. The correctly byte-aligned LD result is provided to a second multiplexer in the second logic circuit that selects either this LD-to-LD address-forwarded result or a normal LD address path. The result from the second multiplexer is the next address for the second LD operation. In one embodiment, the correct alignment may be based on four bytes. In another embodiment, the correct alignment may be based on an alignment that is different from four bytes.

If either of the following conditions is not met, then the address-generation operation occurs serially after the first LD operation: The first condition is that the LD instruction is to be directed to a correctly aligned memory address, and the second condition is that the LD instruction does not need sign extension.

FIG. 1 depicts a functional block diagram of an example embodiment of a CPU 100 according to the subject matter disclosed herein that reduces latency associated with instructions executed by the CPU 100. The CPU 100 includes a core 101, a fetch unit 102, a decoder 103, a dispatch unit 104, an integer execution unit 105, a floating point unit 106, and an LSU 200. The core 101 and the various units 102-106 generally operate in a known manner. Although the core 101 and the various units 102-106 are depicted as being connected in a certain arrangement, it should be understood that other connection arrangements are possible. Additionally, it should be understood that other functional blocks that are not shown in FIG. 1 may be included in the CPU 100.

Figure 2:
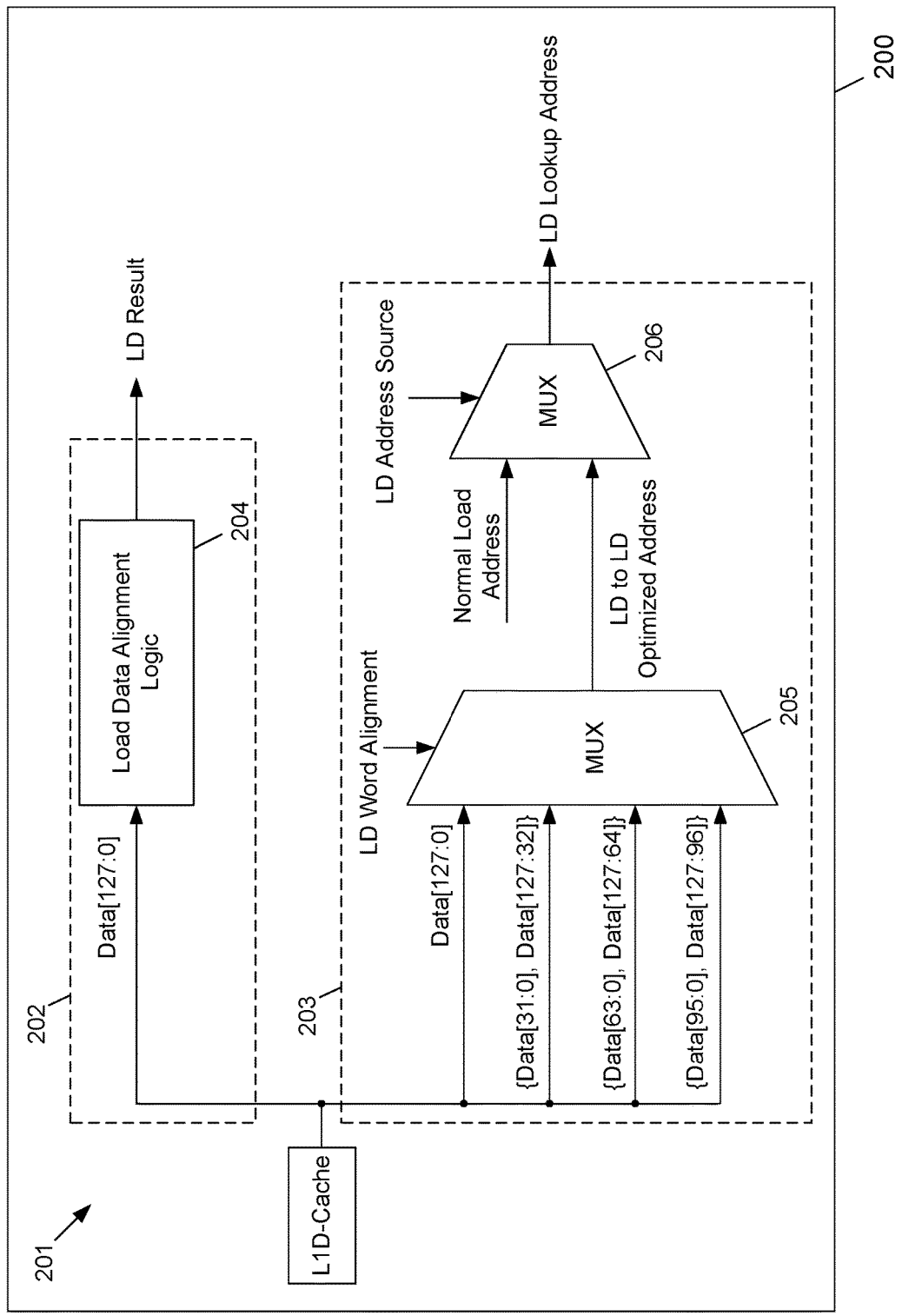
FIG. 2 depicts a functional block diagram of an example embodiment of an LD instruction cascader within an LSU according to the subject matter disclosed herein.

FIG. 2 depicts a functional block diagram of an example embodiment of an LD instruction cascader 201 within an LSU 200 according to the subject matter disclosed herein. The LD instruction cascader 201 includes a first logic circuit 202 and a second logic circuit 203 that is in parallel with the first logic circuit 202. The first logic circuit 202 includes a load data alignment logic 204, and the second logic circuit 203 includes a data-alignment multiplexer 205 and an address-selection multiplexer 206.

Figure 3A:
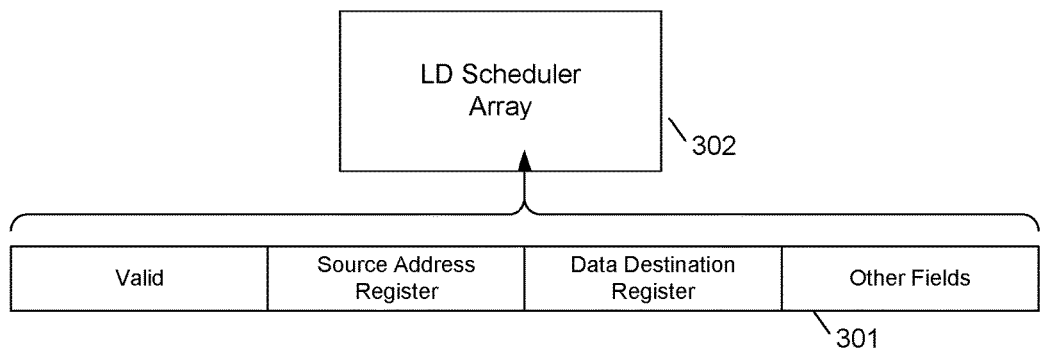
FIG. 3A depicts one embodiment of information relating to LD instructions being saved in an LD scheduler array according to the subject matter disclosed herein.
Figure 3B:
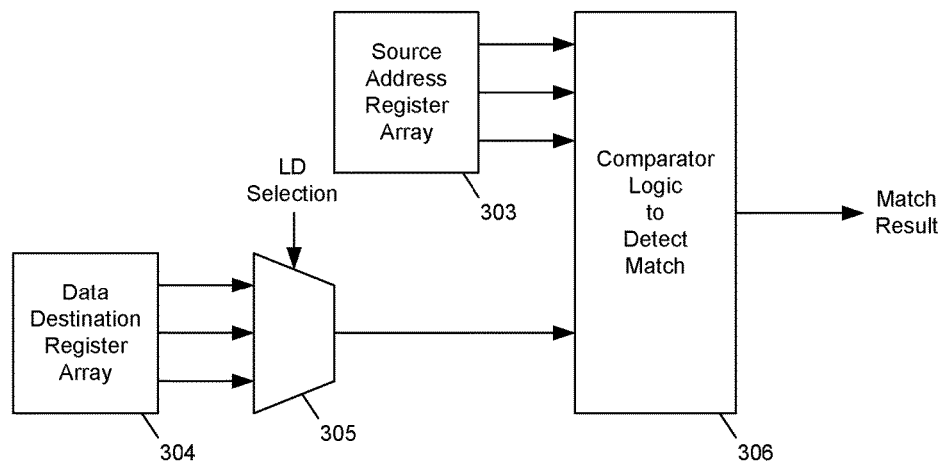
FIG. 3B depicts one embodiment of example logic to compare source address information to data destination information according to the subject matter disclosed herein.

The LSU 200 may detect a cascading load-to-load scenario, that is, a producer LD instruction that may generate data used by a consumer LD instruction for address-generation. In one embodiment, the LSU 200 may detect a cascading load-to-load scenario by the LSU 200 saving information relating to LD instructions in an LD scheduler array. FIG. 3A depicts one embodiment of information 301 relating to LD instructions being saved in an LD scheduler array 302 according to the subject matter disclosed herein. The saved information 301 may include information relating to a source register to generate a corresponding LD address and also a destination register. As LD instructions are selected in the scheduler array 302, the destination register information may be extracted from the scheduler array and compared against the addresses of all earlier LD instructions in the scheduler array. If there is a match, then a cascading load-to-load scenario has been detected. FIG. 3B depicts one embodiment of example logic to compare source address information to data destination information according to the subject matter disclosed herein. In FIG. 3B, source address information in a source address register array 303 is compared to data destination information in a data destination register array 304. A multiplexer 305 selects the data destination information based on an LD selection signal. The source address information and the data destination information are compared in a comparator logic 306. The output of the comparator logic 306 indicates the result of the comparison between the source address information and the data destination information and whether a consumer load may be a candidate for cascading. The condition that a candidate LD instruction is to be directed to a correctly aligned memory address, and the condition that that the LD instruction does not need sign extension may be enforced by a simple logic check.

The LSU 200 may schedule the producer LD instruction to execute and may schedule the beginning of the execution of the consumer LD instruction to coincide with the results of the producer LD instruction if the producer LD instruction is to be directed to a byte-aligned memory address, and that the producer LD instruction does not need sign extension. If both of these conditions exist, the load data alignment logic of the first logic circuit 202 may be bypassed for the consumer LD instruction, and the address-generation for the consumer LD instruction may occur in parallel with the load data alignment logic 204 for the producer LD instruction. By bypassing the load data alignment logic 204 for the consumer LD instruction, the load-to-load latency may be reduced.

For example, if the producer LD instruction is 4-byte aligned, then the producer LD instruction may cascade its memory result to the consumer LD instruction address. This allows bypassing of the several stages of multiplexers that align non 4-byte aligned memory addresses.

As a further example, if the byte alignment for the first LD instruction is a 4-byte alignment and if the first LD memory address has an address of 0x1004, the alignment multiplexer 205 in the second parallel logic circuit 203 selects the data-value of {Data[31:0], Data[127:32]} because this provides the correct alignment for the memory address. The LD word alignment signal may be generated by logic that, in an embodiment of 4-byte alignment cascading, may determine address bits [1,0] to be 2'b00 and address bits [3,2] will indicate the word selection within a 16-byte window. If the dependent LD instruction is scheduled to execute this cycle, then the LD address source will select this address, which is referred to herein as an LD-to-LD optimized address. Otherwise, the normal LD instruction address will be selected by the address-selection multiplexer 206. The control logic of the scheduler may determine whether the LD instruction being selected is a cascading consumer operation or a normal load operation. If the instruction is a cascading consumer operation, then the LD address source signal may indicate that the cascading address should be selected. The selected address output from the address-selection multiplexer 206 becomes the LD lookup address for the dependent LD instruction that was scheduled to execute in this cycle.

Figure 4:
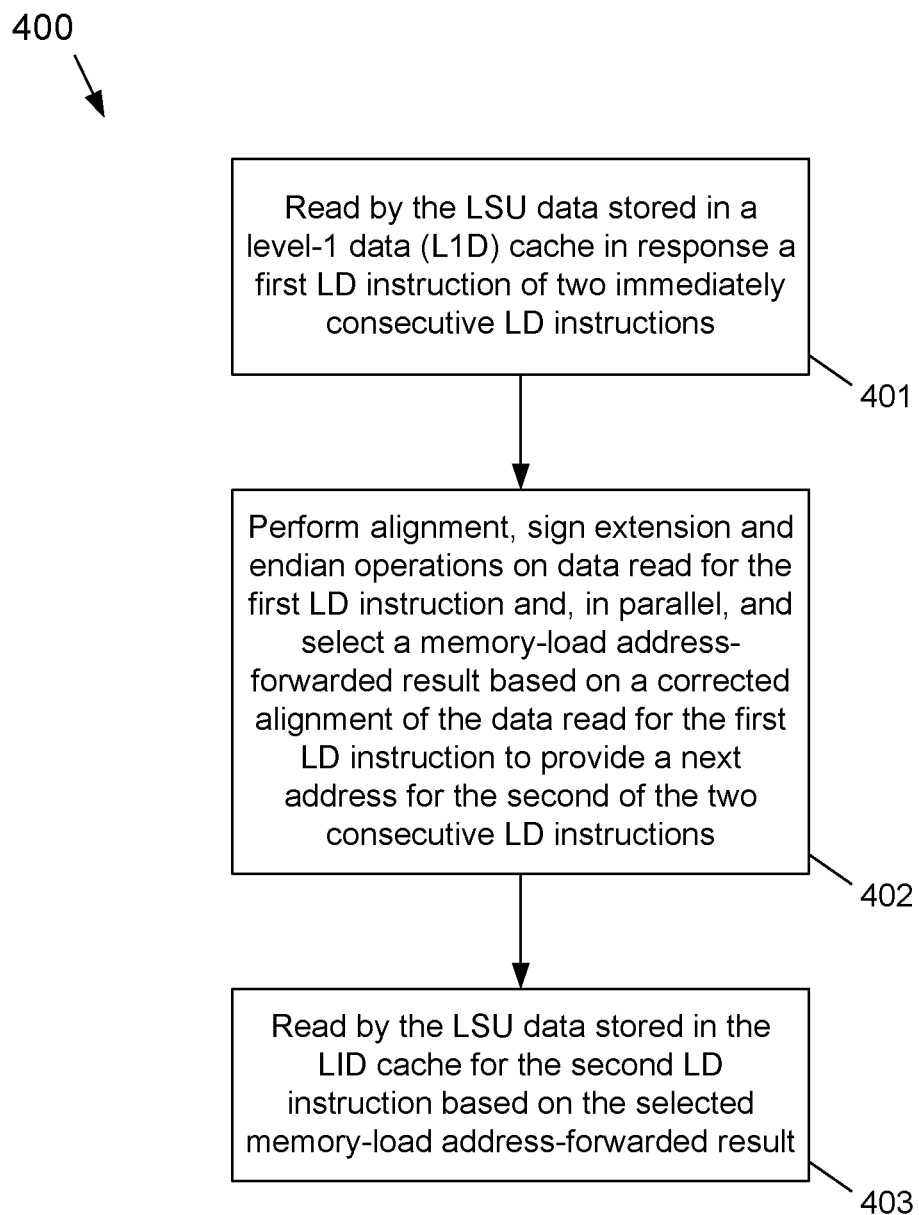
FIG. 4 depicts an example embodiment of a method to cascade execution in an LSU of a CPU of producer-consumer LD instructions according to the subject matter disclosed herein.

FIG. 4 depicts an example embodiment of a method 400 to cascade execution in an LSU of a CPU of producer-consumer LD instructions according to the subject matter disclosed herein. At 401, data for a first LD instruction is read from a L1D cache in response a first LD operation of two immediately consecutive LD instructions in which the first LD instruction is a producer LD and the second LD instruction is a consumer LD instruction. Additionally, the first LD instruction is to be directed to a byte-aligned memory address, and the first LD instruction does not need sign extension.

At 402, alignment, sign extension, and endian operations for the first LD instruction are performed and, in parallel, and a memory-load address-forwarded result is selected based on a corrected alignment of the first LD instruction to provide a next address for the second of the two LD instructions. At 403, data stored in the L1D cache is read by the LSU for the second LD instruction based on the selected memory-load address-forwarded result.

Figure 5:
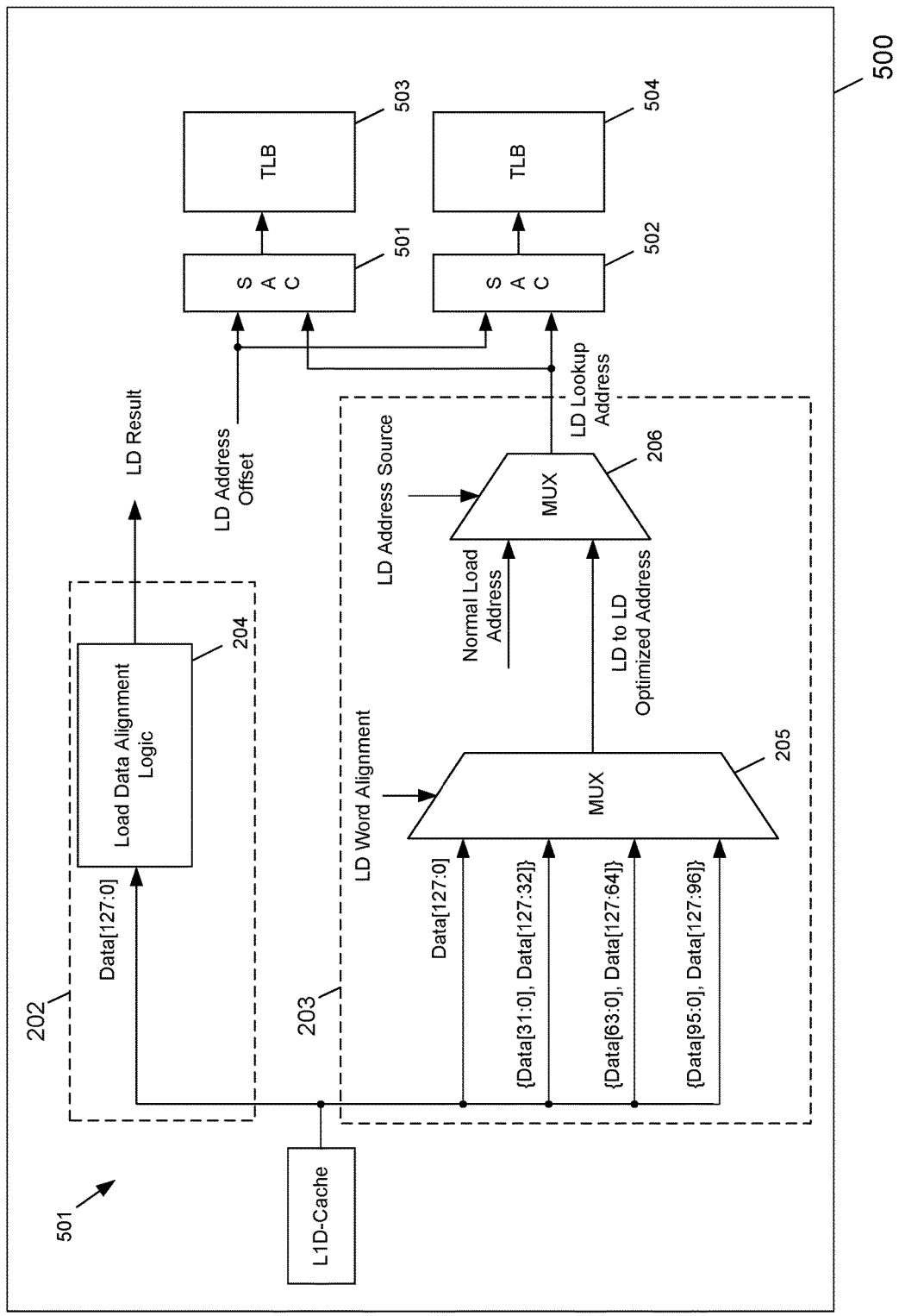
FIG. 5 depicts a functional block diagram of an example alternative embodiment of an LD instruction cascader within an LSU according to the subject matter disclosed herein.

In an alternative embodiment, the first stage of execution of an LD instruction may include a lookup of a translation lookaside buffer (TLB) and L1D-cache tag structures. Common mechanisms to speed up the lookups of the TLB and tag structures may be to use sum-addressed content-addressable memory (CAMing) of the TLB and sum-addressed decoding of the tag-lookup index. Both techniques involve the addends of the memory-address generation to be used as inputs into the sum-addressed CAM or decoding logical circuits. FIG. 5 depicts a functional block diagram of an example alternative embodiment of an LD instruction cascader 501 within an LSU 500 according to the subject matter disclosed herein. The alternative embodiment of an LD instruction cascader 501 includes many of the same components that are depicted in FIG. 2 and will not be described again. The LD instruction cascade 501 also includes first and second sum address CAM logic circuits 501 and 502 respectively, and first and second TLB circuits 503 and 504 respectively. According to this alternative embodiment, if the LSU 500 utilizes sum-addressed logic to lookup TLB and TAG structures, then the LSU 500 may use the individual addends of an address generation for an LD operation. Therefore, the second LD instruction in the LD/LD sequence may have another operand other than the destination register of the first LD instruction.

Figure 6:
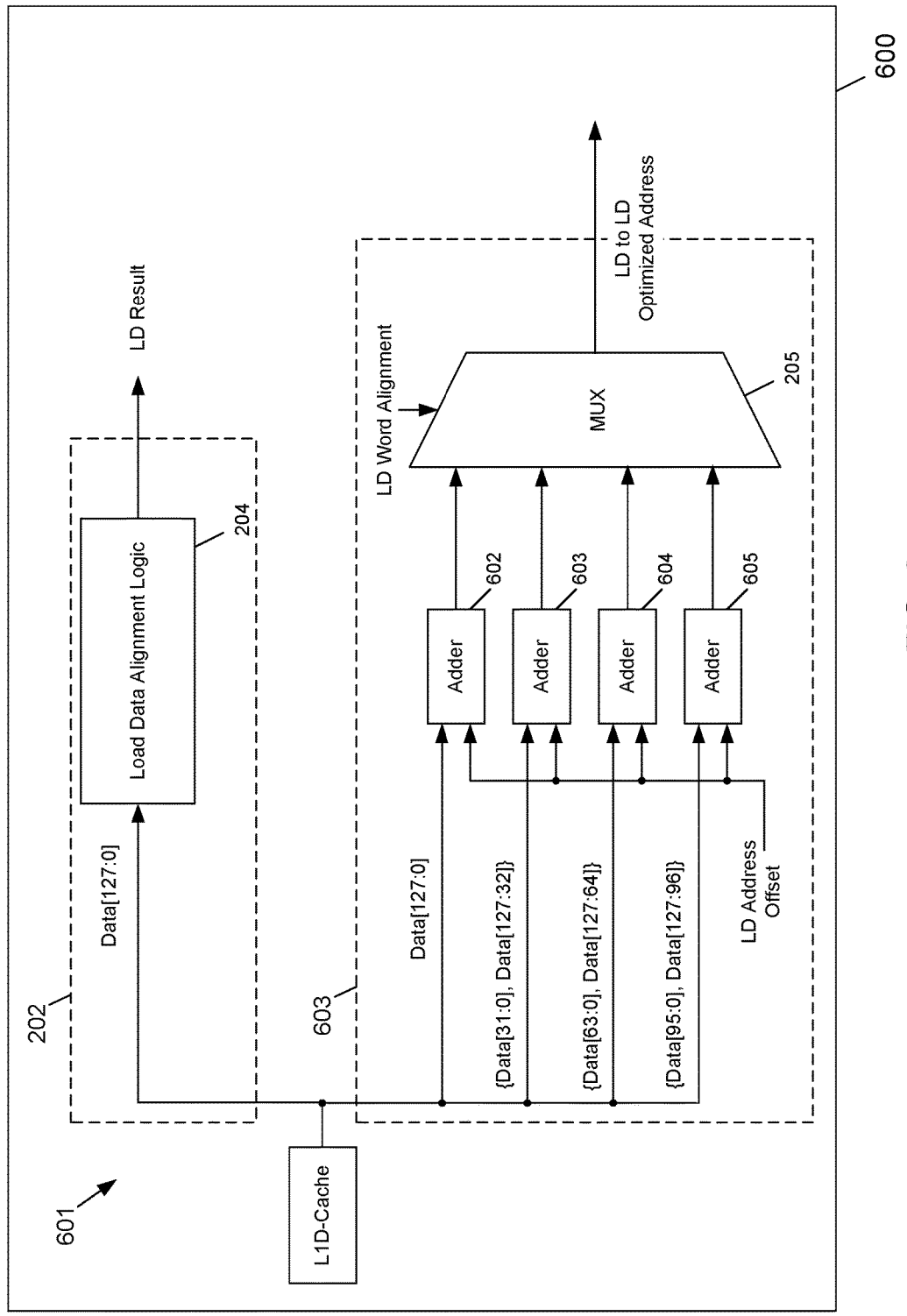
FIG. 6 depicts a functional block diagram of a portion of another example alternative embodiment of an LD instruction cascader within an LSU according to the subject matter disclosed herein.

Consider, for example, the following instructions: LD r0, [r1] and LD r2, [r0, offset]. When the LD instructions are cascaded, or fused, together, the inputs to the LSU would be the first LD address (r1) and the offset to the second LD address. This offset may either be an immediate value or another register. FIG. 6 depicts a functional block diagram of a portion of another example alternative embodiment of an LD instruction cascader 601 within an LSU 600 according to the subject matter disclosed herein. The LD instruction cascader 601 includes many of the same components that are depicted in FIG. 2 and will not be described again. The LD instruction cascade 601 may include a logic circuit 603 that includes adders 602-605 for the second LD memory address in which each adder 602-605 may use a different alignment of the data value of the first LD operation. The number of adder logical circuits that are executed in parallel for different alignment possibilities may vary. For example, if the L1D-cache data read is a 16-byte result, then there may be 16 adders for each possible byte-alignment.

According to one embodiment, an LSU may include extra adders that are based on a predetermined data-size and sign/zero extension. In this way, any LD instruction may be optimized to reduce latency similar to the LD/LD fusing already described that may benefit inter-process communication (IPC).

According to another embodiment, if an LSU detects a load-to-load cascading scenario, logic may be bypassed to optimize operation for common cases and speed up the address generation of consumer loads. In that regard, the subject matter disclosed herein may generate a subsequent address based on the previous memory-read operation.

According to another embodiment, a first memory LD instruction may be cascaded, or fused, with a second immediately subsequent address-dependent LD instruction performing by an LSU performing the first LD instruction and generating a memory address for the second LD instruction, in which the memory address for the second LD instruction is dependent on the first LD instruction; receiving, by a data cache, the first LD instruction. The present embodiment further provides simultaneously, the first LD instruction to an alignment logic and a first multiplexer in which the alignment logic performs one or more of an alignment operation, a sign extension operation, and an endian operation, in which the first multiplexer selects an aligned memory address for the first LD instruction, and in which a second multiplexer selects the selected aligned memory address or a normal LD address path. The present embodiment further provides an output from the second multiplexer as the memory address for the second LD instruction.

Although the present disclosure is described with respect to a data cache, it is appreciated that the present system and method may apply to an instruction cache without deviating from the scope of the present disclosure. For example, when an instruction cache reads a first instruction address, the first instruction address may have any alignment and endianness. The present system may bypass the alignment logic and determine if the first instruction address from the instruction cache is a direct branch control transfer instruction that may be used to lookup a dependent second instruction address from the instruction cache again helping to speed up branch prediction.

According to one embodiment, the present system may be applied to training data/instruction prefetching. The present system may cascade or fuse a second immediately subsequent address-dependent instruction whose execution may train a data/instruction prefetcher. The present system may be further applied to training stride prefetching according to one embodiment.

According to one embodiment, the present system further detects a series of hits/misses to modify an evict level, thereby helping to speed up hit/miss detection because load execution speed has been increased.

Figure 7:
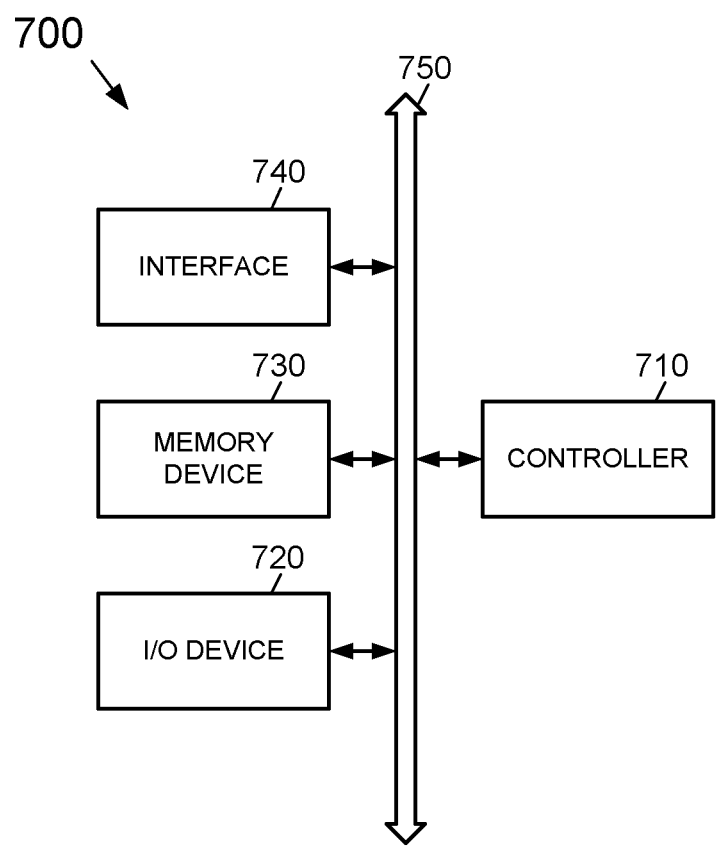
FIG. 7 depicts an electronic device that comprises one or more integrated circuits (chips) comprising to cascade execution of instructions in an LSU of a CPU to reduce latency associated with the instructions according to the subject matter disclosed herein.

FIG. 7 depicts an electronic device 700 that comprises one or more integrated circuits (chips) comprising to cascade execution of instructions in an LSU of a CPU to reduce latency associated with the instructions according to the subject matter disclosed herein. Electronic device 700 may be used in, but not limited to, a computing device, a personal digital assistant (PDA), a laptop computer, a mobile computer, a web tablet, a wireless phone, a cell phone, a smart phone, a digital music player, or a wireline or wireless electronic device. The electronic device 700 may comprise a controller 710, an input/output device 720 such as, but not limited to, a keypad, a keyboard, a display, a touch-screen display, a camera, and/or an image sensor, a memory 730, and an interface 740 that are coupled to each other through a bus 750. The controller 710 may comprise, for example, at least one microprocessor, at least one digital signal process, at least one microcontroller, or the like. The memory 730 may be configured to store a command code to be used by the controller 710 or a user data. Electronic device 700 and the various system components comprising electronic device 700 may comprise to cascade execution of instructions in an LSU of a CPU to reduce latency associated with the instructions according to the subject matter disclosed herein. The interface 740 may be configured to include a wireless interface that is configured to transmit data to or receive data from a wireless communication network using a RF signal. The wireless interface 740 may include, for example, an antenna, a wireless transceiver and so on. The electronic system 700 also may be used in a communication interface protocol of a communication system, such as, but not limited to, Code Division Multiple Access (CDMA), Global System for Mobile Communications (GSM), North American Digital Communications (NADC), Extended Time Division Multiple Access (E-TDMA), Wideband CDMA (WCDMA), CDMA2000, Wi-Fi, Municipal Wi-Fi (Muni Wi-Fi), Bluetooth, Digital Enhanced Cordless Telecommunications (DECT), Wireless Universal Serial Bus (Wireless USB), Fast low-latency access with seamless handoff Orthogonal Frequency Division Multiplexing (Flash-OFDM), IEEE 802.20, General Packet Radio Service (GPRS), iBurst, Wireless Broadband (WiBro), WiMAX, WiMAX-Advanced, Universal Mobile Telecommunication Service—Time Division Duplex (UMTS-TDD), High Speed Packet Access (HSPA), Evolution Data Optimized (EVDO), Long Term Evolution—Advanced (LTE-Advanced), Multichannel Multipoint Distribution Service (MMDS), and so forth.

As will be recognized by those skilled in the art, the innovative concepts described herein can be modified and varied over a wide range of applications. Accordingly, the scope of claimed subject matter should not be limited to any of the specific exemplary teachings discussed above, but is instead defined by the following claims.

What is claimed is:

1. A method to cascade execution of instructions of a central processing unit (CPU), comprising:
   reading one of a first data and first instruction stored in a first cache in response to a first memory load instruction of two consecutive memory load instructions; and
   performing in parallel,
      one or more of alignment, sign extension, and endian operations on the first data read from the first cache in response to the first memory load instruction, and
      selecting a memory-load address-forwarded result based on a corrected alignment of the one of the first data and the first instruction read in response to the first memory load instruction to provide a next address for a second memory load instruction of the two consecutive memory load instructions; and
   reading the corresponding one of a second data and a second instruction in response to the second memory load instruction based on the selected memory-load address-forwarded result.

2. The method of claim 1, wherein the first memory load instruction comprises a byte-aligned memory address, and
   wherein the first memory load instruction comprises no sign extension.

3. The method of claim 2, wherein the first memory load instruction comprises a 4 byte aligned memory address.

4. The method of claim 2, wherein the second memory load instruction is dependent upon the first memory load instruction to produce an address for the second memory load instruction.

5. The method of claim 1, wherein the reading of the one of the first data and the first instruction occurs during a first execution cycle, and
   wherein the alignment, sign extension and/or endian operations on the one of the first data and the first instruction, and the selecting of the memory-load address-forwarded result occurs in a second execution cycle that is immediately subsequent to the first execution cycle.

6. The method of claim 1, further comprising looking up a translation lookaside buffer and a cache tag array based on the second memory load instruction to determine a stored location of the second data.

7. The method of claim 6, wherein the stored location of the corresponding one of the second data and the second instruction is one of the first cache and a second cache.

8. The method of claim 7, further comprising reading one of the first data and the first instruction stored in a respective one of a data cache and an instruction cache.

9. The method of claim 1, further comprising reading the first data stored in the first cache by one of a LSU and a data prefetching unit.

10. The method of claim 1, wherein the first instruction is a direct branch control transfer instruction.

11. A central processing unit (CPU), comprising:
    a load data alignment logic circuit to perform one or more of alignment sign extension and endian operations on one of a first data and a first instruction received from a cache in response to a first memory load instruction of two consecutive memory load instructions; and
    a selector logic circuit in parallel to the load data alignment logic circuit, the selector logic circuit to temporally perform in parallel with the load data alignment logic circuit a selection of a memory-load address-forwarded result based on a corrected alignment of the first data read in response to the first memory load instruction to provide a next address for a second memory load instruction of the two consecutive memory load instructions, the selected memory-load address-forwarded result being used to read second data from the cache in response to the second memory load instruction.

12. The CPU of claim 11, wherein the first memory load instruction comprises a byte-aligned memory address, and
    wherein the first memory load instruction comprises no sign extension.

13. The CPU of claim 12, wherein the first memory load instruction comprises a 4 byte aligned memory address.

14. The CPU of claim 12, wherein the second memory load instruction is dependent upon the first memory load instruction to produce an address for the second memory load instruction.

15. The CPU of claim 11, wherein the CPU reads the one of the first data and the first instruction from the cache occurs during a first execution cycle of the CPU, and
    wherein the alignment, sign extension and/or endian operations performed by the load data alignment logic circuit and the selection of the memory-load address-forwarded result performed by the selector logic circuit occurs in a second execution cycle of the CPU that is immediately subsequent to the first execution cycle of the CPU.

16. The CPU of claim 11, further comprising a translation lookaside buffer and a cache tag array that determine a stored location of the corresponding one of the second data and the second instruction based on the second memory load instruction.

17. The CPU of claim 16, wherein the stored location of the corresponding one of the second data and the second instruction is one of the first cache and a second cache.

18. The CPU of claim 17, further comprising the cache, wherein the cache is one of a data cache and an instruction cache.

19. The CPU of claim 11, wherein the load data alignment logic circuit and the selector logic circuit are part of one of a load store unit (LSU) and a data prefetching unit.

20. The CPU of claim 11, wherein the first instruction is a direct branch control transfer instruction.

* * * * *